United States Patent
Weerasinghe et al.

(10) Patent No.: US 10,087,748 B2
(45) Date of Patent: Oct. 2, 2018

(54) METHOD, APPARATUS AND SYSTEM FOR SAFE MODE TELEMETRY SYSTEM

(71) Applicant: Schlumberger Technology Corporation, Sugar land, TX (US)

(72) Inventors: Nalin Weerasinghe, Imbulgoda (LK); Khalid Ouaaba, Machida (JP); Maduranga Liyanage, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/569,768

(22) Filed: Dec. 14, 2014

(65) Prior Publication Data

US 2015/0167451 A1    Jun. 18, 2015

Related U.S. Application Data (60) Provisional application No. 61/917,240, filed on Dec. 17, 2013.

(51) Int. Cl.
*G01V 3/00* (2006.01)
*E21B 47/12* (2012.01)
*H04L 29/08* (2006.01)

(52) U.S. Cl.
CPC .............. *E21B 47/12* (2013.01); *H04L 67/12* (2013.01)

(58) Field of Classification Search
CPC ............. E21B 33/0355; E21B 41/0021; E21B 43/1185; E21B 43/119; E21B 43/12; G01V 11/002; G01V 3/18; H02J 13/0024; H02J 3/00; F42D 1/055; G05B 9/02

USPC .................. 340/855.8, 855.9, 853.2
See application file for complete search history.

(56) References Cited

U.S. PATENT DOCUMENTS

| | | | | |
|---|---|---|---|---|
| 4,393,485 A | * | 7/1983 | Redden ................... | E21B 47/00 175/40 |
| 6,046,685 A | * | 4/2000 | Tubel ...................... | E21B 23/03 137/606 |
| 6,273,189 B1 | * | 8/2001 | Gissler .................... | E21B 4/04 166/241.1 |
| 6,628,992 B2 | | 9/2003 | Osburn, III | |
| 7,009,312 B2 | * | 3/2006 | Hernandez-Marti ... | E21B 47/00 307/34 |
| 7,181,515 B2 | | 2/2007 | Lin et al. | |
| 2002/0163441 A1 | * | 11/2002 | Hill ......................... | E21B 47/12 340/855.4 |
| 2002/0178295 A1 | | 11/2002 | Buczek et al. | |

(Continued)

*Primary Examiner* — Emily C Terrell
(74) *Attorney, Agent, or Firm* — Sara K. M. Hinkley (57) ABSTRACT

A method, apparatus and system for safe mode telemetry are provide. The method may include detecting a failure of an AC power supply, switching the AC power supply to a DC power supply, booting with a safe mode telemetry system by a control unit, and capturing downhole data for recording into a memory. The apparatus may include a telemetry cartridge, a control unit to detect a failure of an AC power supply, a DC power supply, and a switching device to change from the AC power supply to the DC power supply based on the control unit's detection of the failure in the AC power supply. The DC power supply of the apparatus may be used to power the telemetry cartridge after the detection of the failure. The system may further include a surface data acquisition unit and a downhole tool including the apparatus.

20 Claims, 6 Drawing Sheets

(56) References Cited

U.S. PATENT DOCUMENTS

| | | | |
|---|---|---|---|
| 2005/0029476 A1* | 2/2005 | Biester | E21B 33/0355 251/58 |
| 2006/0038699 A1* | 2/2006 | Dodge | G01V 11/002 340/854.8 |
| 2009/0045975 A1* | 2/2009 | Evans | G01V 11/002 340/855.5 |
| 2010/0194586 A1* | 8/2010 | Tjhang | G01V 11/002 340/854.7 |
| 2011/0066378 A1* | 3/2011 | Lerche | E21B 43/116 702/6 |
| 2016/0003035 A1* | 1/2016 | Logan | E21B 47/12 340/854.6 |

\* cited by examiner

METHOD, APPARATUS AND SYSTEM FOR SAFE MODE TELEMETRY SYSTEM

BACKGROUND

The following descriptions and examples are not admitted to be prior art by virtue of their inclusion in this section.

Hydrocarbon fluids, such as oil and natural gas, may be obtained from a subterranean geologic formation, referred to as a reservoir, by drilling a well that penetrates a hydrocarbon-bearing formation. A variety of downhole tools may be used in various areas of oil and natural gas services. In some cases, downhole tools may be used in a well for surveying, drilling, and production of hydrocarbons. The downhole tools may communicate with the surface via various telemetry systems. In some cases, the downhole tools may comprise one or more individual modules in operative communication with one another, such as a master module and multiple slave modules. Examples of communication systems are provided in US Patent/Application Nos. U.S. Pat. Nos. 6,628,992, 7,181,515, and 20020178295.

With the increased precision of downhole tools and sensors, relatively shorter time may be available to send increasingly larger amounts of data. In addition to new modules and assemblies being developed for downhole use on a continuing basis, tool bus systems may facilitate communication between older and newer generations of modules in order to obtain the maximum service life from existing older modules.

Applications of disclosed embodiments of the present disclosure are not limited to these illustrated examples, different industrial applications may benefit from implementations of the following disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In at least one aspect, the disclosure relates to a method for safe mode telemetry system. The method can include detecting a failure of AC power supply by a sensor and switching from AC to DC if the failure detected. The method can also include booting with safe mode telemetry system by using a control unit and capturing downhole data for sending a minimum amount of house-keeping data to surface.

In at least one aspect, the disclosure relates to an apparatus for safe mode telemetry. The apparatus can be coupled to the surface via a cable. The apparatus may include a telemetry cartridge, a control unit to detect a failure of an AC power supply, and a DC power supply. The apparatus may also include a switching device to change from the AC power supply to the DC power supply based on the control unit's detection of the failure in the AC power supply. The DC power supply may be used to power the telemetry cartridge after the detection of the failure.

In at least one aspect, the disclosure relates to a system to provide safe mode telemetry communication. The system may comprise a surface data acquisition unit and a downhole tool. The downhole tool may further include a telemetry cartridge, a control unit to detect a failure of an AC power supply, a DC power supply, and a switching device to change from the AC power supply to the DC power supply based on the control unit's detection of the failure in the AC power supply. The DC power supply may be used to power the telemetry cartridge after the detection of the failure for communication with the surface data acquisition unit.

Other or alternative features will become apparent from the following description, from the drawings, and from the claims.

BRIEF DESCRIPTION OF THE DRAWINGS

Embodiments of method and apparatus for safe mode telemetry system are described with reference to the following figures. Like numbers are used throughout the figures to reference like features and components.

DETAILED DESCRIPTION

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", "upstream" and "downstream", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both objects or steps, respectively, but they are not to be considered the same object or step.

The terminology used in the description herein is for the purpose of describing particular embodiments only and is not intended to be limiting of the disclosure and embodiments presented herewith. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of only one associated listed items or more than one combinations of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The disclosure relates to method and apparatus for safe mode telemetry system in a cable telemetry for a wellsite to support a logging operation in case of a power line failure. The cable telemetry may enable data reception from tools and send data commands to downhole tools via, for example, a wireline heptacable. The safe mode telemetry system may enable a continuous supply power to downhole toolstrings when DC supply shuts down due to an accident such as a broken cable. Furthermore, the safe mode telemetry system may enable storing logging data from the downhole tools via a telemetry cartridge located in one of the toolstrings. Hereinafter, "cable telemetry" refers generally to communication between an uphole modem and a downhole modem over a cable.

Safe Mode Telemetry System Overview

Figure 1:
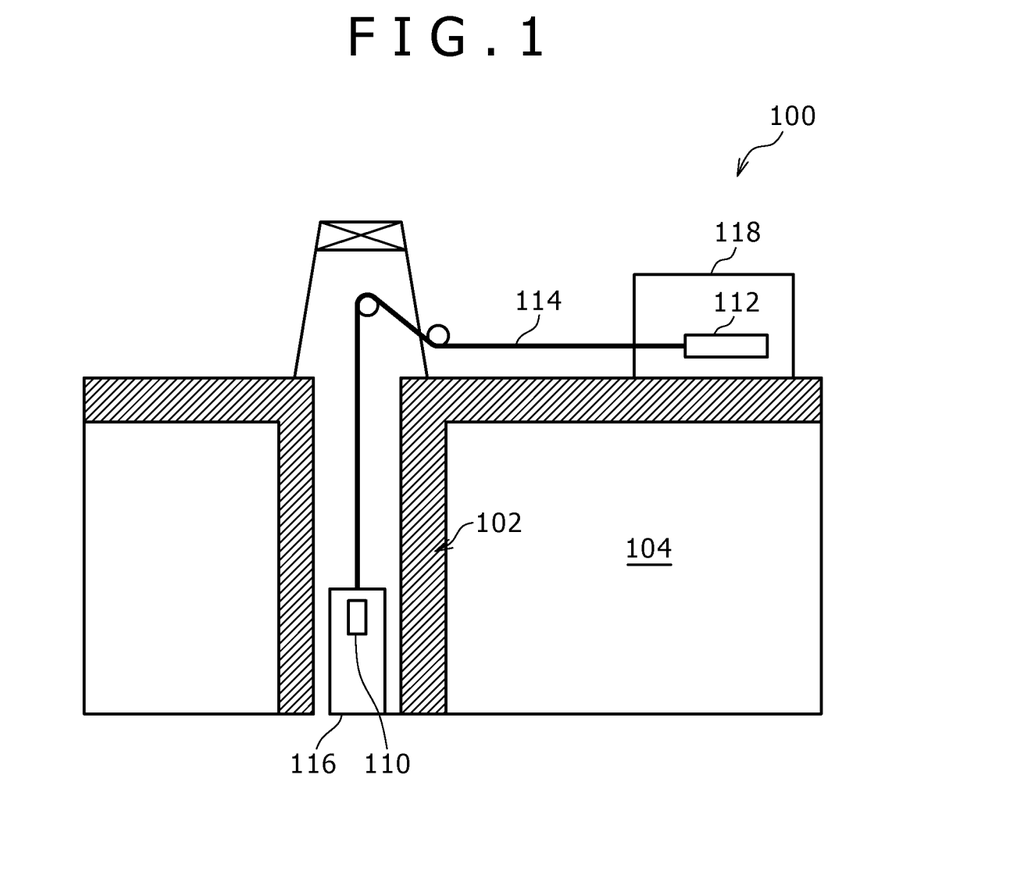
FIG. 1 is a schematic representation illustrating a wellsite with a borehole traversing a subsurface formation and having a system for multiple carrier frequencies, half duplex cable telemetry in accordance with an embodiment of the present disclosure.

Generally referring to illustrative FIG. 1, an example wireline logging operation is illustrated with respect to the wellsite system 100 employed in a wellbore 102 traversing a subsurface formation 104. A downhole telemetry cartridge 110 is connected to a toolstring 116. In a well-logging operation, a plurality of tools (e.g., 230, 230', etc. of FIG. 2) may be connected in the toolstring 116. The tools of the toolstring 116 communicate with the downhole telemetry circuits of downhole telemetry cartridge 110 via a bi-directional electrical interface.

In some embodiments, the tools of the toolstring 116 may be connected to the telemetry cartridge 110 over a common data bus. While in other embodiments, each tool of the toolstring 116 may be individually, directly connected to the telemetry cartridge 110. In additional embodiments, the telemetry cartridge 110 may be a separate unit, which is mechanically and electrically connected to the tools in the toolstring 116. Further, in some embodiments, the telemetry cartridge 110 may be integrated into a housing of one of the well-logging tools 116.

The telemetry cartridge 110 is operatively coupled to a wireline cable 114. The tools of the toolstring 116, including the telemetry cartridge 110, may be lowered into the wellbore 102 on the wireline cable 114.

A surface data acquisition computer 118 is located at the surface end of the wireline cable 114. The surface data acquisition computer 118 includes or couples to an uphole telemetry unit 112. The data acquisition computer 118 may provide control of the components in the toolstring 116 and process and store the data acquired downhole. The acquisition computer 118 may communicate with the uphole telemetry unit 112 via a bi-directional electrical interface.

The uphole telemetry unit 112 may modulate downlink commands from the acquisition computer 118 for transmission down the cable 114 to the toolstring 116, and demodulates uplink data from the toolstring 116 for processing and storage by the surface data acquisition computer 118.

The downhole telemetry cartridge 110 contains circuitry to modulate uplink data from the tools of the toolstring 116 for transmission up the wireline cable 114 to the surface data acquisition computer 118 and to demodulate downlink commands or data from the surface data acquisition computer 118 for the tools of the toolstring 116.

Figure 2:
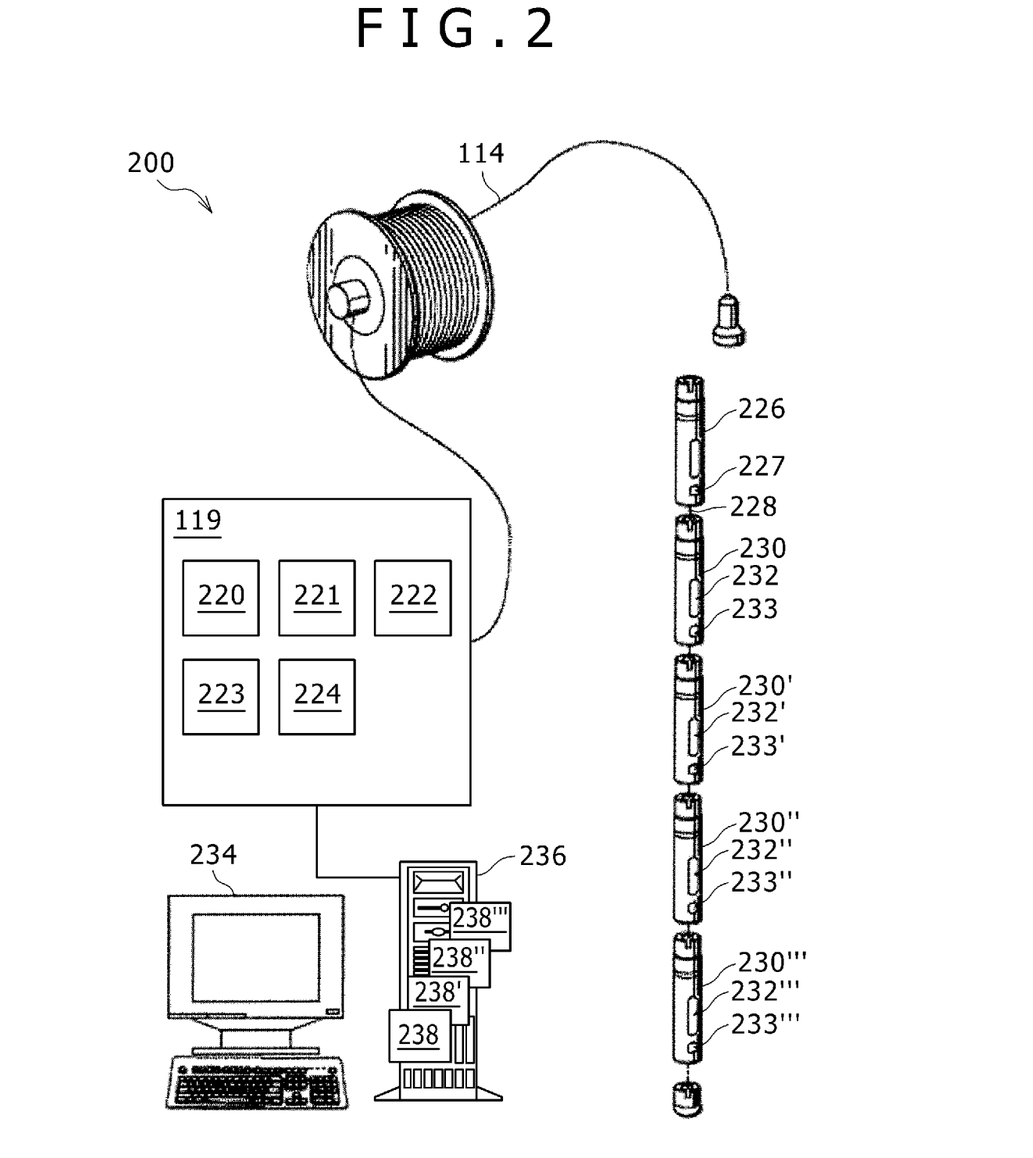
FIG. 2 shows a block diagram illustrating an example system for multiple carrier frequencies, half duplex cable telemetry in accordance with an embodiment of the present disclosure.

A more detailed schematic view of an example cable telemetry system 200 is shown in exemplary FIG. 2. The cable telemetry system 200 of the embodiment shown includes a surface acquisition module/surface modem 220 with a telemetry interface module 222, which can be located at the surface as a portion of or operatively coupled to the surface data acquisition front end 119 (a component of surface data acquisition computer 118 of FIG. 1). The front end 119 may be, for example, eWAFE™ commercially available from SCHLUMBERGER™ (see: www.slb.com).

The surface data acquisition front end 119 is coupled to the wireline cable 114, and a downhole modem 226 (as a portion of the downhole telemetry cartridge 110 at the head of the toolstring 116 such as shown in FIG. 1). The tool string 116 includes a number of downhole tools, 230, 230', 230", 230''', etc. In some embodiments the downhole tools 230, 230', etc., each contain a respective interface package, 232, 232', 232", 232''', etc., through which they are in communication with the downhole module 226 via a tool bus 228. The downhole tools 230, 230', 230", 230''', etc. may also have tool node controllers 233, 233', 233", 233''', etc., respectively.

The cable telemetry system 200 may also handle data flows in opposite directions (i.e., from the tools 230, 230', etc.) via their respective nodes and the tool bus 228. The flow extends to the downhole module 226 to the surface acquisition module/surface modem 220 over the cable 114 ("uplink"), and the reverse direction from the surface acquisition module/surface modem 220 to the downhole module 226 and to the tools 230, 230', etc., over the same path ("downlink"). The cable telemetry system 200 provides a communication path from the tools, 230, 230', etc., to the surface acquisition module/surface modem 220 of the data acquisition computer 118 so that data acquired by the sensors 231, 231', 231", 231''', etc. of the downhole tools 230, 230', etc. can be processed and analyzed at the surface, as well as communication between tools 230, 230', etc.

Each individual tool (230, 230', etc.) may include a node command buffer (not shown) at the interface package 232, 232', etc., as well as a logic controller of its own (also not shown). The surface acquisition front-end unit 119 may also include various additional components, such as a power module 221, a depth and tension module 223, and a flow controller software module 224.

In some embodiments, the downhole telemetry cartridge 226 can include a downhole master node controller 227 that may examine packets sent by each respective tool 230, 230', etc. Data communicated in either direction may be copied and buffered at the master node controller 227, and sent to the recipient.

A surface computer 234 can store and execute a surface data dispatcher module 236 (which may be, in an exemplary embodiment, a software data routing module, such as SCHLUMBERGER's™ MAXWELL™ framework). The surface computer 234 can also store and execute a plurality of surface tool-specific applications 238, 238', 238", 238''', etc. that analyze and use data obtained, respectively, by tools 230, 230', etc.

In another embodiment, the surface data acquisition front-end 119 may comprise SCHLUMBERGER's™ hybrid eWAFE™ unit. While in other embodiments, the downhole module 226 comprises a hybrid telemetry cartridge. In further embodiments, the downhole module 226 may comprise a hybrid cable comprising a plurality of copper cables and a plurality of optical cables, for example, such as heptacables.

The heptacables may contain several electrical conductors, in some cases for example, seven wires. The outer armor, generally, may have a center conductor with six additional conductors wound helically around the center conductor. Data may be simultaneously transmitted on these several conductors. The distinct combinations of conductors used in a heptacable or other multi-conductor cables are referred to herein as "propagation modes." In some cases, the propagation modes can be telemetry modes or power modes.

Figure 3:
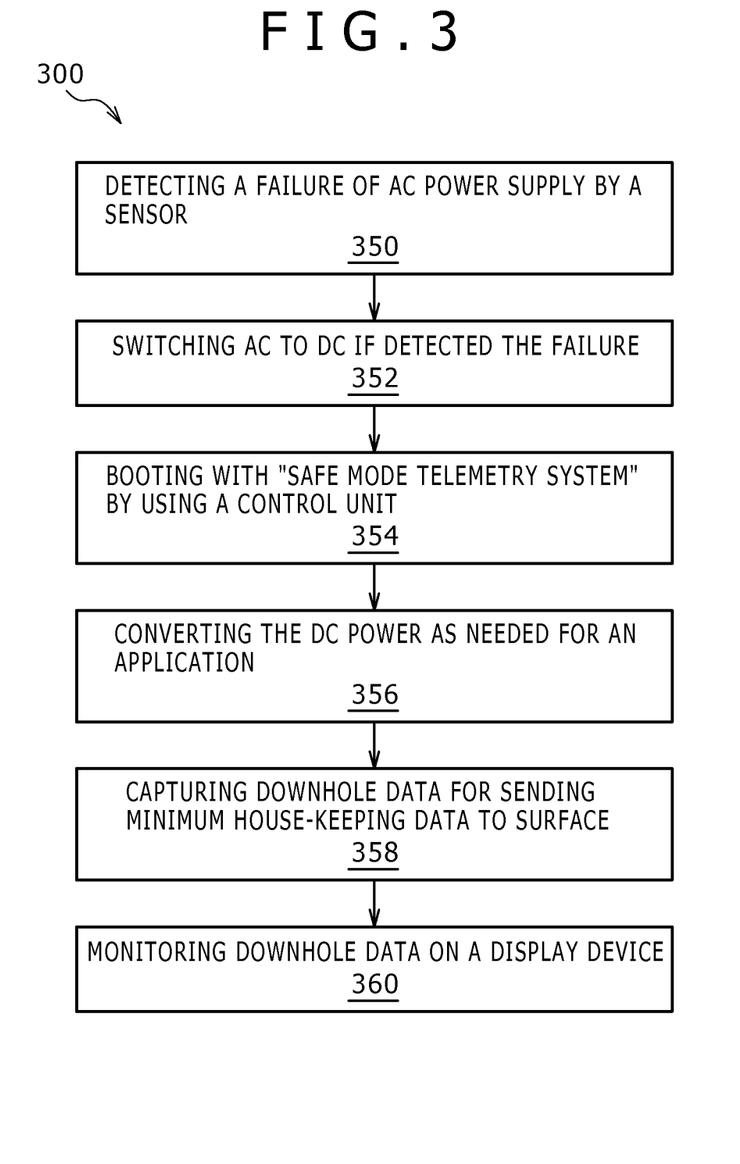
FIG. 3 is a flowchart illustrating a method for safe mode telemetry system in accordance with an embodiment of the present disclosure.

Referring to FIG. 3, a flow chart is shown for a method 300 for a safety telemetry mode which can be implemented in an embodiment of a system such as that shown in FIG. 2. The method begins with detecting 350 a failure of AC power supply. In some embodiments, the method can start an automatically or manually generated test signal by a user at the surface computer 234 to detect by means of a sensor whether a failure of AC happens due to, for example, a power line becoming disabled.

After detecting the failure of the AC power supply, the method continues with switching 352 the AC power supply to a DC power supply, for example, battery power located in a downhole battery cartridge. In order to accomplish the switching, at least one relay device for switching can be used.

The method may continue with booting 354 the safe mode telemetry system by using a control unit. In some embodiments, the booting modem can be provided with either a Frequency Shift Keying (FSK) or Binary Phase Shift Keying (BPSK) standard on a low powered control unit. Therefore, in a safe mode operations high processing power for the safety mode system is not provided. In other embodiments, by shifting to the safe mode the logging operation can continue normal operation with a limited power supply.

The method continues with converting 356 the DC power as needed for an application for logging. In some cases, conversion of the DC-AC power supply can be used to power up downhole tools for an extended time period based upon the downhole battery power capacity. Many kinds of DC-AC converters can be used for this conversion, as easily understood by a skilled person in the art.

The method continues with capturing 358 downhole data in order to send a minimum amount of house-keeping data to a surface modem. In some cases, capturing the data can comprise recording downhole tool data into a memory, for example, at a high temperature environment. The minimum house-keeping data can include the logging data at the timing of a failure and any related environmental information, but the house-keeping data is not limited to these items. While in other embodiments, diagnostic data can be recorded as well as the downhole tool data so that a user at the surface can see the telemetry status before and after a failure.

House-keeping data is generally a classification of data related to aspects of running a tool downhole. The data itself may include tool health monitoring related information and tool environmental measures such as, but not limited to, temperature, pressure, humidity, shock level, among others, etc. to avoid or at least indicate when a tool has been run outside of standard operating specifications. The information may be useful in predicting maintenance intervals, tool life estimations, and potential for future failure, as well as allowing analysis of the surrounding conditions in the event of a failure. House-keeping data is not typically delivered to the client as it is more useful for the operator of the tool.

The method continues with monitoring 360 downhole data on a display device. In some embodiments, a user at the surface can monitor at least a part of the downhole data recorded in a memory even when a power failure occurred. While in other embodiments, the monitoring can be implemented during the logging operation and also after the logging.

Figure 4:
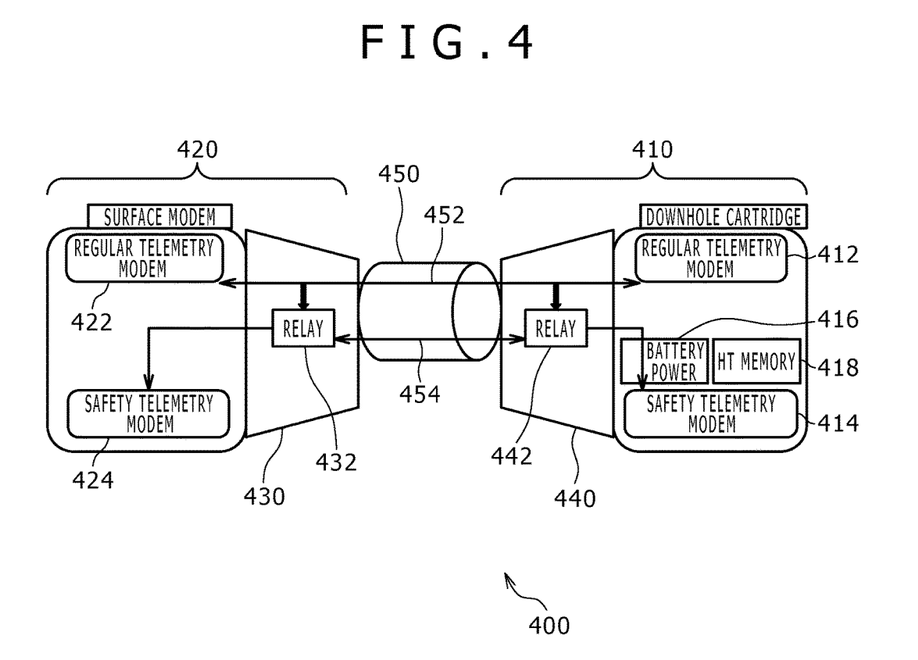
FIG. 4 is a schematic block diagram of a safe mode telemetry system in accordance with an embodiment of the present disclosure.

Referring now to FIG. 4, an apparatus overview for an embodiment of safe mode telemetry 400 is illustrated. In some embodiments, upon failure of a power line 452 contained within a cable 450, a surface relay 432 in the surface acquisition cable interface unit 430 of the surface acquisition system 420 can switch from a surface regular telemetry modem 422 to a surface safety telemetry modem 424. In addition, in a logging head/cartridge head unit 440 of a downhole telemetry cartridge 410, a downhole relay 442 can switch from the downhole regular telemetry modem 412 to battery power 416, a downhole safety telemetry modem 414, and high temperature memory 418. The safe mode telemetry system 400 may then communicate via the telemetry line 454 of cable 450 instead of the power line 452. The safety telemetry modems 424 and 414 may be low powered telemetry modem comprising a number of different configurations. In some embodiments, the safety telemetry modems are configured as field programmable gate arrays (FPGA) while in other embodiments they may be configured as a microcontroller or Application Specific Integrated Circuit (ASIC), among other configurations.

Figure 5:
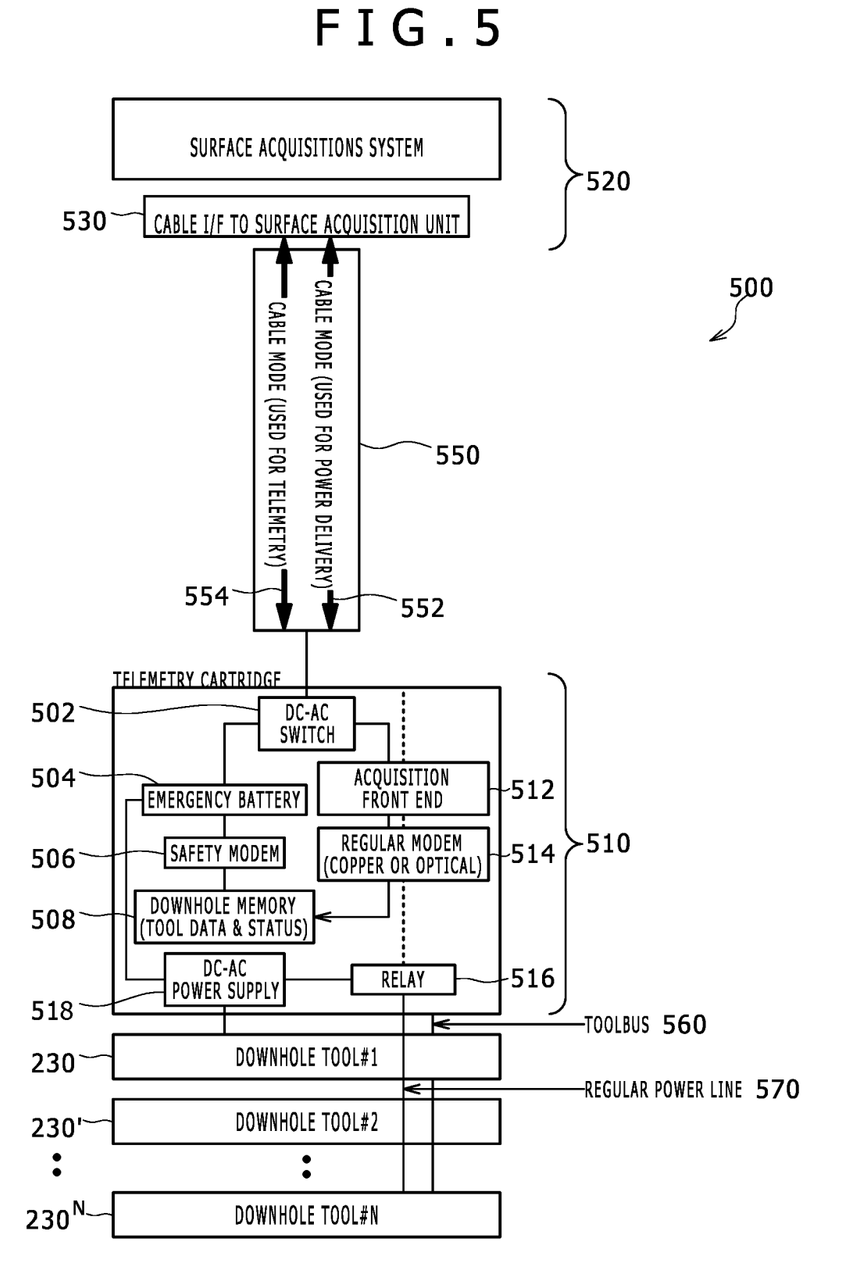
FIG. 5 is a schematic block diagram of a hybrid telemetry system with safe mode telemetry system including a heptacable in accordance with an embodiment of the present disclosure.

Referring to FIG. 5, an embodiment of hybrid safety mode telemetry system 500 having for example, a multi-core cable 550 (for the purposes of this embodiment, heptacable for example), is illustrated, in which a downhole telemetry cartridge 510 is connected to the multi-core cable 550. As seen in this exemplary embodiment, a surface acquisition system 520 is coupled to the multi-core cable via a surface cable interface 530 (I/F). The multi-core cable 550 has various cable modes used for both power 552 and telemetry 554. The multi-core cable 550 is then coupled to a series of downhole tools 230, 230' . . . 230$^N$, etc., via the downhole telemetry cartridge 510. The downhole tools 230, 230' . . . 230$^N$, etc., may in turn be interconnected to one another via a regular power line 570 and/or a tool bus 560.

In some embodiments, the downhole telemetry cartridge 510 comprises an AC/DC switch 502 coupled to an emergency battery 504 and an acquisition front end 512. In the event of a failure in the AC power line, the AC/DC switch uses the emergency battery 504 to provide power to the rest of the downhole system via the DC-AC conversion power supply 518. The emergency battery 504 may also provide power to the safety modem 506 and the downhole memory 508 storing tool data and status such as surrounding environmental conditions (in some cases).

A relay 516 switches the power from the AC power line 552 to the DC-AC conversion power supply 518 and also switches from the regular modem 514 to the safety modem 506. The tools 230, 230' . . . 230$^N$, etc., may continue to communicate data and/or data to the downhole memory 508 so that a picture of the situation before and after the failure can be observed.

Figure 6:
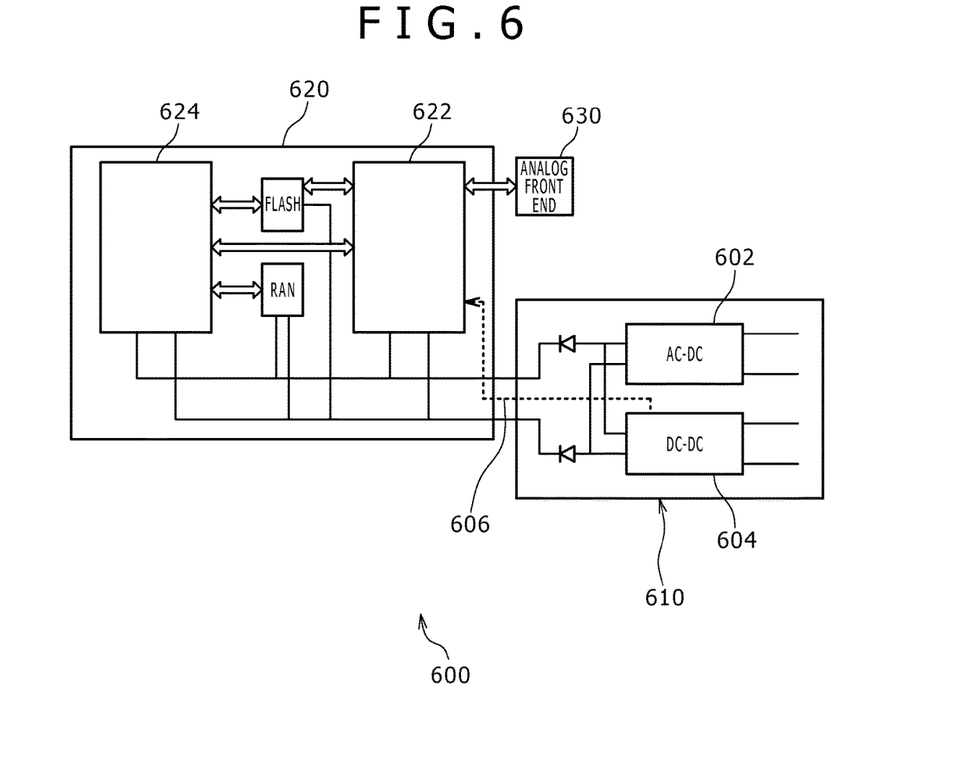
FIG. 6 is a schematic block diagram of AC-DC and DC-DC switch connecting safe mode telemetry modem in accordance with an embodiment of the present disclosure.

Referring to FIG. 6, an embodiment of a safety mode telemetry system 600 in which an AC-DC 602 and DC-DC 604 switch are connected to a safe telemetry modem 610 is illustrated in the block diagram as shown. In the embodiment, via the dotted-line communication pathway 606, a signal can inform the control unit 620 such as a field programmable gate array 622 (FPGA) and digital signal processor 624 (DSP) that the power mode has been changed to a safe mode using AC from a battery. In an embodiment, DC-AC supply can provide an extended life of logging with downhole tools. As depicted in FIG. 6, the control unit 620 is electrically coupled to an analog front end 630.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from the present disclosure.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for safe mode telemetry, the method comprising:
    detecting a failure of an AC power supply, the AC power supply to provide power over a power line of a cable to a downhole telemetry cartridge, the cable further including a telemetry line in addition to the power line, the downhole telemetry cartridge including a switching device, a DC power supply, a memory, a first modem operatively coupled to a surface system via the power line of the cable, and a second modem operatively coupled to the surface system via the telemetry line of the cable, the first modem being operable at a first power to transmit data from the downhole telemetry cartridge to the surface system when the downhole telemetry cartridge is receiving power from the AC power supply, the second modem being operable at a second power lower than the first power to transmit data from the downhole telemetry cartridge to the surface system when the downhole telemetry cartridge is receiving power from the DC power supply; and
    in response to detecting the failure of the AC power supply:
        switching the downhole telemetry cartridge, via the switching device, from receiving power from the AC power supply to receiving power from the DC power supply;
        booting the second modem via the DC power supply; and
        capturing downhole data for recording into the memory.

2. The method according to claim 1, further comprising converting power supplied by the DC power supply to DC power or AC power.

3. The method according to claim 1, further comprising transmitting house-keeping data from the second modem of the downhole telemetry cartridge, over the telemetry line of the cable, to a surface modem of the surface system.

4. The method according to claim 1, further comprising monitoring of real-time downhole data.

5. The method according to claim 1, wherein the second modem comprises at least one of a FPGA, a microcontroller, or an ASIC.

6. An apparatus for safe mode telemetry, the apparatus comprising:
    a downhole telemetry cartridge including a switching device, a DC power supply, a first modem to be operatively coupled to a surface system via a power line of a cable, and a second modem to be operatively coupled to the surface system via a telemetry line of the cable, the first modem being operable at a first power to transmit data from the downhole telemetry cartridge to the surface system when the downhole telemetry cartridge is receiving power from an AC power supply over the power line of the cable, the second modem being operable at a second power lower than the first power to transmit data from the downhole telemetry cartridge to the surface system when the downhole telemetry cartridge is receiving power from the DC power supply,
    the switching device to switch the downhole telemetry cartridge from the AC power supply to the DC power supply in response to a detection of a failure of the AC power supply via a control unit, the DC power supply to power the downhole telemetry cartridge after the detection of the failure.

7. The apparatus according to claim 6,
    wherein the downhole telemetry cartridge further includes a memory device to store downhole tool data from before and after the detection of the failure.

8. The apparatus according to claim 6, further comprising:
    at least one sensor to measure ambient conditions;
    wherein the ambient conditions surrounding the detection of the failure are stored in the memory device.

9. The apparatus according to claim 6, wherein the second modem comprises at least one of a FPGA, a microcontroller, or an ASIC.

10. The apparatus according to claim 6,
    wherein the downhole telemetry cartridge further includes a DC to AC power converter the DC to AC power converter to convert at least a portion of the DC power supplied via the DC power supply to a converted AC power.

11. The apparatus according to claim 10,
    wherein the downhole telemetry cartridge further includes a DC to DC power converter the DC to DC power converter to convert at least a portion of the DC power supplied via the DC power supply to a converted DC power.

12. The apparatus according to claim 6, wherein the switching device comprises a relay.

13. A system to provide safe mode telemetry communication, the system comprising:
    a surface system;
    a cable including a power line and a telemetry line, the power line to provide power supplied via an AC power supply; and a downhole telemetry cartridge operatively coupled to the surface system via the cable, the downhole telemetry cartridge comprising:
a DC power supply;
a first modem operatively coupled to the surface system via the power line of the cable, the first modem being operable at a first power to transmit data from the downhole telemetry cartridge to the surface system when the downhole telemetry cartridge is receiving power from the AC power supply;
a second modem operatively coupled to the surface system via the telemetry line of the cable, the second modem being operable at a second power lower than the first power to transmit data from the downhole telemetry cartridge to the surface system when the downhole telemetry cartridge is receiving power from the DC power supply; and
a switching device to switch the downhole telemetry cartridge from the AC power supply to the DC power supply in response to a detection of a failure of the AC power supply via a control unit, the DC power supply to power the telemetry cartridge after the detection of the failure for communication with the surface system.

14. The system according to claim 13, wherein the cable is a heptacable including a center conductor and six additional conductors helically wound about the center conductor.

15. The system according to claim 13, wherein the surface system further comprises a display device to communicate downhole data received from the downhole telemetry cartridge.

16. The system according to claim 13, wherein the downhole telemetry cartridge further comprises a DC to AC power conversion device to convert at least a portion of the DC power supplied via the DC power supply to a converted AC power after the detection of the failure.

17. The system according to claim 13, wherein the second modem of the downhole telemetry cartridge is to transmit house-keeping data to a surface modem of the surface system after the detection of the failure.

18. The method of claim 1, wherein the first modem of the downhole telemetry cartridge is operatively coupled via the power line of the cable to a third modem of the surface system, and the second first modem of the downhole telemetry cartridge is operatively coupled via the telemetry line of the cable to a fourth modem of the surface system, the third modem being operable at a third power to receive data from the first modem when the downhole telemetry cartridge is receiving power from the AC power supply, the fourth modem being operable at a fourth power lower than the third power to receive data from the third modem when the downhole telemetry cartridge is receiving power from the DC power supply.

19. The apparatus of claim 6, wherein the first modem of the downhole telemetry cartridge is to be operatively coupled via the power line of the cable to a third modem of the surface system, and the second first modem of the downhole telemetry cartridge is to be operatively coupled via the telemetry line of the cable to a fourth modem of the surface system, the third modem being operable at a third power to receive data from the first modem when the downhole telemetry cartridge is receiving power from the AC power supply, the fourth modem being operable at a fourth power lower than the third power to receive data from the third modem when the downhole telemetry cartridge is receiving power from the DC power supply.

20. The apparatus of claim 13, wherein the first modem of the downhole telemetry cartridge is operatively coupled via the power line of the cable to a third modem of the surface system, and the second first modem of the downhole telemetry cartridge is operatively coupled via the telemetry line of the cable to a fourth modem of the surface system, the third modem being operable at a third power to receive data from the first modem when the downhole telemetry cartridge is receiving power from the AC power supply, the fourth modem being operable at a fourth power lower than the third power to receive data from the third modem when the downhole telemetry cartridge is receiving power from the DC power supply.

* * * * *